May 19, 1964     O. J. POUPITCH     3,133,378
NAIL TYPE FASTENERS
Original Filed Sept. 18, 1956
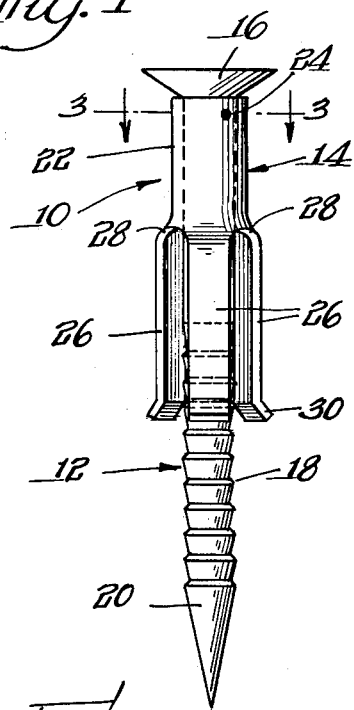
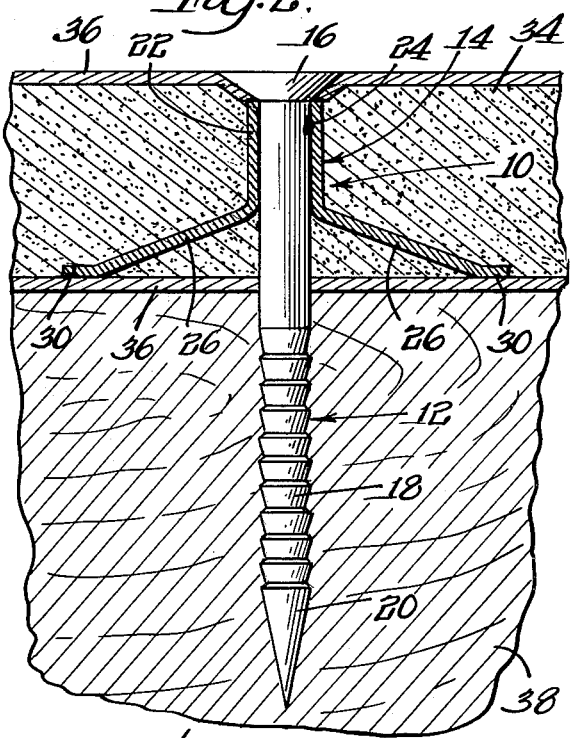
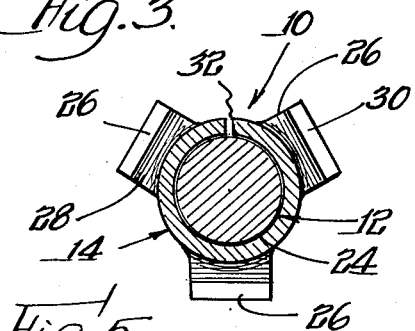
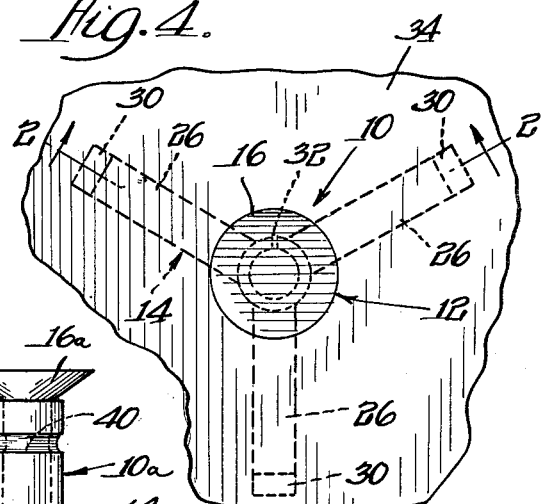
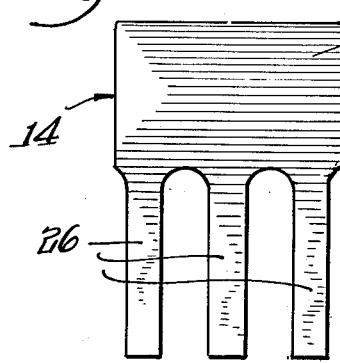
INVENTOR.
Ougljesa Jules Poupitch
BY Olson & Trexler

United States Patent Office 3,133,378
Patented May 19, 1964

3,133,378
NAIL TYPE FASTENERS
Ougijesa Jules Poupitch, Itasca, Ill., assignor to Illinois Tool Works Inc., a corporation of Delaware
Continuation of application Ser. No. 610,495, Sept. 18, 1956. This application Mar. 12, 1959, Ser. No. 799,045
5 Claims. (Cl. 50—319)

This invention is concerned generally with the art of fasteners, and more particularly with a nail or nail-type fastener for attaching gypsum board and the like to wooden structural members.

The present application is a continuation of my copending application Serial No. 610,495, filled September 18, 1956, for "Nail Type Fastener," now abandoned.

Plasterboard or gypsum board often is nailed against studs or other wooden structural elements, and then is suitably finished to provide a wall surface. In some instances, the plasterboard may serve as a base for a finish coat or coats of plaster, or the plasterboard may be used simply as the finished wall itself, adjacent panels of plasterboard being taped and cemented together, the entire wall than being painted.

When the plasterboard is used as the finished wall itself, it will be apparent that the heads of nails mounting the plasterboard to the studs or the like must be completely hidden. Shrinking of the wood behind the plasterboard tends to cause the heads of the nails to pop out from the surface of the plasterboard. Furthermore, in some instances a nail may not be driven tightly enough originally, and there is a tendency, when pressure is applied to the wall, for the nail head to pop out through the painted surface. Obviously, such popping out of nail heads is extremely undesirable.

Accordingly, it is an object of this invention to provide a nail or nail-type fastener for mounting plasterboard on studs or the like, which nail or fastener will not pop out from the surface of the plasterboard.

More specifically, it is an object of this invention to provide a nail or nail-type fastener for plasterboard wherein the plaster board is positively anchored against axial movement relative to the nail or fastener.

A still further object of this invention is to provide a nail or nail-type fastener for use with plasterboard wherein retaining means on the nail or fastener extends outwardly into the plasterboard during driving of the nail or fastener, positively to lock the plasterboard relative to the nail.

Other and further objects and advantages of the present invention will be apparent from the following description when taken in connection with the accompanying drawings, wherein:

FIG. 1 is a side view of a nail or nail-type fastener produced in accordance with the principles of this invention;

FIG. 2 is a longitudinal sectional view of such a fastener as installed, the view being taken substantially along the line 2—2 in FIG. 4;

FIG. 3 is a cross-sectional view through the fastener as taken along the line 3—3 in FIG. 1;

FIG. 4 is a top view of the fastener as applied in FIG. 2;

FIG. 5 is a plan view of the blank forming the retaining portion of the fastener; and FIG. 6 is a fragmentary side view similar to FIG. 1 and illustrating a modification of the invention.

Referring now in greater particularity to the drawings, and first to FIGS. 1–4, there will be seen a nail-type fastener identified generally by the number 10, and comprising a nail 12 and a retainer 14 permanently assembled therewith. The nail 12 comprises a head 16, conveniently a beveled head, and a shank 18 having a pointed tip 20. The shank 18 preferably is provided with serrations or locking sections in the form of frusto-conical sections, whereby the nail will drive relatively easily into a wooden stud or the like, but will resist retraction therefrom.

The retainer 14 is stamped of sheet metal, and the blanked out retainer is shown in FIG. 5. The retainer comprises a cylindrical body section 22 encircling the shank of the nail near the upper end thereof, and permanently affixed thereto, such as by means of a spot weld 24. It will be appreciated that some form of adhesive other than welding could be used to secure the cylindrical or tubular body section 22 of the retainer to the nail shank. The retainer 22 also includes a plurality of arms or prongs 26. The prongs 26 are secured to the body 22 by oblique offsets 28, and extend parallel to the body section 22, but spaced outwardly from the nail shank. The prongs 26 are provided with outwardly deflected tips 30.

As will be appreciated from FIG. 5, the retainer 14 is originally formed as a flat blank. The shoulders or offsets 28 then are formed, as are the outwardly deflected tips 30, and the body 22 is curved into tubular form. As will be appreciated, this leaves a slight gap 32 in the body, which is of no consequence in the operation of the fastener. Indeed, it will be appreciated that the retainer could be made from tubular stock, but it might be expected that this would be a more difficult and costly proceeding.

When the fastener 10 is driven into a plasterboard panel 34 (FIGS. 2 and 4) having the usual surface sheets 36 of paper or the like thereon, the outwardly deflected tips 30 resist driving straight in, and cause the prongs 26 to deform or deflect outwardly, thereby causing the prongs to lock firmly in or behind the plasterboard panel 34. This prevents retraction of the fastener relative to the plasterboard, and it acts with the head 16 to limit inward movement of the fastener relative to the plasterboard panel. The shank 18 is received in a wooden stud 38 or the like, and it will be appreciated that if the nail would not be driven all of the way in, there would be a slight space between the panel and the stud. However, the plasterboard panel would be held firmly relatively to the stud, and could not be pressed inwardly towards the stud to allow the nail head 16 to pop out from the surface. Similarly, shrinking or warping of the wood could not cause the head to pop out of the surface of the plasterboard.

In accordance with the invention as heretofore described, the retainer is held to the nail by means such as welding or an adhesive. It also is contemplated that other means could be provided for securing the retainer on the nail. Thus, a modification of the invention is shown in FIG. 6. In this embodiment of the invention, similar parts are identified by numerals similar to those heretofore used, with the addition of the suffix a. In this embodiment of the invention the nail 12a is provided with a recess or circumferential groove 40 about the shank, preferably adjacent the head, and a complementary indentation or inward protuberence 42 in the body 22a of the retainer 14a locks the retainer on the nail against axial movement relative thereto.

In accordance with either of the embodiments of the invention, it will be appreciated that the prongs, preferably of sheet metal, are deformed or deflected outwardly into or behind the plasterboard positively to insure a permanent mounting of the plasterboard relative to the shank of the nail.

As will be understood, the examples of the invention as herein shown and described are for illustrative purposes only. Various changes in structure will no doubt occur to those skilled in the art, and are to be understood as form- The invention is claimed as follows:

1. The construction comprising an imperforate and substantially planar relatively soft building material of predetermined substantially uniform thickness such as plasterboard and the like; a backing member such as wood adapted to receive and retain a nail; and a pre-assembled nail-type fastener comprising a drive nail having a shank extending through the predetermined substantially uniform thickness of said relatively soft material and received in said backing member, said shank having a piercing driving end in said backing member, said nail having an enlarged head at the end opposite said piercing driving end and substantially flush with the surface of said relatively soft material opposite said backing member, said head being of substantially greater diameter than said shank and a retainer on said shank comprising a sleeve body of a diameter less than the diameter of said head telescopically associated with a portion of the shank adjacent the head and affixed thereto to prevent longitudinal movement of the retainer relative to the nail with one end of the sleeve body disposed adjacent the head and with the remote end thereof extending into the building material a distance which is a substantial proportion of the said predetermined substantially uniform thickness of the building material, and a plurality of prongs disposed symmetrically about the said remote end of the sleeve body extending diagonally outwardly therefrom entirely within the relative soft material and toward the piercing driving end of the nail for trapping the relatively soft material between the head and the prongs and along the intermediate surface of the sleeve body.

2. The construction as set forth in claim 1 wherein the relatively soft material has a surface covering of sheet material such as paper on both faces, and the prongs are embedded in the relatively soft material with the outer ends thereof adjacent the covering on the face of the relatively soft material against the backing member.

3. The construction as set forth in claim 1 wherein the prongs have outwardly blunt tips.

4. The construction as set forth in claim 1 wherein the prongs are substantially straight and extend out from the nail shank at a substantial angle.

5. The construction comprising an imperforate and substantially planar relatively soft building material of predetermined substantially uniform thickness such as plasterboard and the like having surface coverings on both faces of sheet material such as paper; a backing member such as wood adapted to receive and retain a nail; and a pre-assembled nail-type fastener comprising a drive nail having a shank extending through the predetermined substantially uniform thickness of said relatively soft material and received in said backing member, said shank having a piercing driving end in said backing member, said nail having an enlarged head at the end opposite said piercing driving end and substantially flush with the surface of said relatively soft material opposite said backing member and indenting the sheet material covering on the outer face of the relatively soft material, said head being of substantially greater diameter than said shank and a retainer on said shank comprising a sleeve body of a diameter less than the diameter of said head telescopically associated with a portion of the shank adjacent the head and affixed thereto to prevent longitudinal movement of the retainer relative to the nail with one end of the sleeve body disposed adjacent the head and with the remote end thereof extending into the building material a distance which is substantially at least half of said predetermined substantially uniform thickness of the building material, and a plurality of substantially straight prongs with deflected blunt tips disposed symmetrically about the said remote end of the sleeve body extending outwardly therefrom entirely within the relatively soft material and at a substantial angle with respect to said shank and toward the piercing driving end of the nail for trapping the relatively soft material between the head and the prongs and along the intermediate surface of the sleeve body.

References Cited in the file of this patent

UNITED STATES PATENTS

| | | |
|---|---|---|
| 860,085 | Ford | July 16, 1907 |
| 1,077,583 | Baxter | Mar. 4, 1913 |
| 1,227,722 | Wills | May 29, 1917 |
| 1,608,773 | Crippen | Mar. 30, 1926 |
| 1,737,413 | Erola | Nov. 26, 1929 |
| 1,763,263 | Shanks | June 10, 1930 |
| 2,126,585 | Stone | Aug. 9, 1938 |
| 2,307,348 | Anderson | Jan. 5, 1943 |
| 2,358,783 | Best | Sept. 26, 1944 |
| 2,440,936 | Elmendorf | May 4, 1948 |
| 2,692,496 | Thomas | Oct. 26, 1954 |
| 2,759,389 | Cockran | Aug. 21, 1956 |
| 2,919,621 | Langdon | Jan. 5, 1960 |

FOREIGN PATENTS

| | | |
|---|---|---|
| 4,408 | Great Britain | May 17, 1890 |
| 159,010 | Great Britain | Feb. 18, 1921 |
| 592,497 | France | Aug. 3, 1925 |